United States Patent [19]

Mudge

[11] 4,190,894
[45] Feb. 26, 1980

[54] HIGH SPEED PARALLEL MULTIPLICATION APPARATUS WITH SINGLE-STEP SUMMAND REDUCTION

[75] Inventor: J. Craig Mudge, Weston, Mass.

[73] Assignee: Digital Equipment Corporation, Maynard, Mass.

[21] Appl. No.: 885,229

[22] Filed: Mar. 10, 1978

[51] Int. Cl.² .................................................. G06F 7/52
[52] U.S. Cl. .................................................. 364/758
[58] Field of Search .......................................... 364/758

[56] References Cited

U.S. PATENT DOCUMENTS

| | | | |
|---|---|---|---|
| 3,752,971 | 8/1973 | Calhoun et al. | 364/758 |
| 3,795,880 | 3/1974 | Singh et al. | 364/758 |
| 3,914,589 | 10/1975 | Gaskill, Jr. et al. | 364/758 |

OTHER PUBLICATIONS

Stenzel et al., "A Compact High-Speed Parallel Multiplication Scheme", *IEEE Trans. on Computers*, vol. C-26, No. 10, Oct. '75, pp. 948-957.

Dadda, "Some Schemes for Parallel Multipliers", *IEEE Trans. on Electronic Computers*, vol. EC-34, No. 5, Dec. 1965, pp. 349-356.

Wallace, "A Suggestion for a Fast Multiplier", *IEEE Trans. on Electronic Computers*, vol. EC-13, Feb. 1964, pp. 14-17.

*Primary Examiner*—David H. Malzahn
*Attorney, Agent, or Firm*—Arthur W. Fisher; Thomas C. Siekman

[57] ABSTRACT

Apparatus for performing high-speed, parallel multiplication in a data processing system wherein each multiplication requires only one step to reduce a plurality of summands to two numbers whose summation equals the product. The fractional portion of two floating point numbers, the multiplier and the multiplicand, are coupled to registers. Thereafter, the multiplicand is multiplied by segments of the multiplier and the resultant products are summed together using a conventional shift and add means. The multiplicand and a segment of the multiplier are each coupled to a plurality of multiplier circuits which produce a plurality of summands. These summands are coupled to a plurality of counter circuits in a manner such that the digits of all of the summands representing the same power of the number 2 may be counted. The counters, using a table look-up scheme, generate two outputs which are coupled to two registers to form two numbers whose summation equals the product of the multiplicand and the segment of the multiplier.

9 Claims, 6 Drawing Figures

| 2's | UNITS | CARRY | | SUM | |
|---|---|---|---|---|---|
| | | d | c | b | a |
| 0 | 0 | 0 | 0 | 0 | 0 |
| 0 | 1 | 0 | 0 | 0 | 1 |
| 0 | 2 | 0 | 0 | 1 | 0 |
| 0 | 3 | 0 | 0 | 1 | 1 |
| 0 | 4 | 0 | 1 | 0 | 0 |
| 1 | 0 | 0 | 0 | 1 | 0 |
| 1 | 1 | 0 | 0 | 1 | 1 |
| 1 | 2 | 0 | 1 | 0 | 0 |
| 1 | 3 | 0 | 1 | 0 | 1 |
| 1 | 4 | 0 | 1 | 1 | 0 |
| 2 | 0 | 0 | 1 | 0 | 0 |
| 2 | 1 | 0 | 1 | 0 | 1 |
| 2 | 2 | 0 | 1 | 1 | 0 |
| 2 | 3 | 0 | 1 | 1 | 1 |
| 2 | 4 | 1 | 0 | 0 | 0 |
| 3 | 0 | 0 | 1 | 1 | 0 |
| 3 | 1 | 0 | 1 | 1 | 1 |
| 3 | 2 | 1 | 0 | 0 | 0 |
| 3 | 3 | 1 | 0 | 0 | 1 |
| 3 | 4 | 1 | 0 | 1 | 0 |
| 4 | 0 | 1 | 0 | 0 | 0 |
| 4 | 1 | 1 | 0 | 0 | 1 |
| 4 | 2 | 1 | 0 | 1 | 0 |
| 4 | 3 | 1 | 0 | 1 | 1 |
| 4 | 4 | 1 | 1 | 0 | 0 |

*Fig. 5.*

| |
|---|
| $R_0 \times D_0$ |
| $R_0 \times D_{28}$ |
| $R_1 \times D_0$ |
| $R_1 \times D_{28}$ |
| $R_2 \times D_0$ |
| $R_2 \times D_{28}$ |
| $R_3 \times D_0$ |
| $R_3 \times D_{28}$ |
| $R_4 \times D_0$ |
| $R_4 \times D_{28}$ |
| $R_5 \times D_0$ |
| $R_5 \times D_{28}$ |
| $R_6 \times D_0$ |
| $R_6 \times D_{28}$ |

*Fig. 6.*

HIGH SPEED PARALLEL MULTIPLICATION APPARATUS WITH SINGLE-STEP SUMMAND REDUCTION

BACKGROUND OF THE INVENTION

1. Field of the Invention

The invention relates generally to high-speed multiplication apparatus and, in particular, to high-speed, parallel multiplication apparatus for use in a data processing system.

2. Brief Description of the Prior Art

In data processing systems, the multiplication of two numbers as a part of the execution of a program is a common occurrence. The speed, then, with which the data processing system performs this multiplication is critical to the performance of the machine.

Various schemes have been developed to increase the speed with which such multiplication functions are performed. However, as these schemes become more elaborate, the cost of implementing them increase. In data processing systems, and particularly, in smaller, economical systems, the extra speed or performance gained by the use of elaborate techniques must be balanced by the cost of incorporating them in the system.

Typically in a data processing system, multiplication of two floating point numbers are required. The exponent portions of both numbers are added together and the sum is concatenated with the product of the fractional portions. The fractional portions of these numbers comprise numerous binary bits. For example, in what is commonly referred to as single-precision multiplication, the fractional portion of the two numbers to be multiplied are comprised of 24 binary bits. In double-precision multiplication, the length is substantially longer, and typically, comprises 56 binary bits in the fractional portion of both floating point numbers to be multiplied.

Due to the size of the fractional portion of these numbers, various schemes have been developed for use in high-performance systems to multiply rapidly the fractional portions of the floating point numbers. Most commonly, the fractional portions of the floating point numbers are divided into segments, typically, four bits in length, which may be multiplied to produce a number of summands which eventually will be combined to form the final product.

Thus, for example, in prior art high-performance systems, each four-bit field in one of the fractions (the multiplicand) is multiplied by each four-bit field of the other fraction (the multiplier) by means of a plurality of multiplier circuits. This process produces numerous (4 bit×4 bit products) summands which all must be recombined to form the product of the multiplicand and the multiplier.

Each of these summands is comprised of a number of binary bits (8 bits for the example above) and each bit represents a particular power of the number 2. If, all the summands are arranged accordingly, then, it can be appreciated that for the purposes of recombination of these summands, there will be numerous such summands having a bit position therein representative of the same power of the number 2 for each and every power of the number 2 in the product. For example, where all six four-bit fields of the multiplier are each multiplied by all six of the four-bit fields of the multiplicand in a single-precision processor, as many as 12 summands may each contain a bit position representative of the same power of the number. These of course must all be added together to form the product of the multiplicand and the multiplier.

In the prior art, several schemes have evolved for rapidly recombining or reducing the summands to form the multiplier/multiplicand product. One such technique is described in an article by C. S. Wallace entitled "A Suggestion for a Fast Multiplier" in volume EC-13 of IEEE Transactions on Electronic Computers dated February of 1964 at pages 14-17. In this technique, the bit positions of each of the summands representing the same power of the number 2 are arranged into a matrix wherein the columns are representative of the various powers of the number 2 and the rows are determined by the number of entries in each column (i.e. bit positions in the summands representing the same power of the number 2). For example, in a single-precision processor, the maximum number of entries in a column (and, hence the maximum number of rows in the matrix) is 12.

The rows of this matrix are reduced in number in successive stages by means of a pseudo-adder tree network. Specifically, groups of three rows in the matrix are added by a string of full adders which reduce each group of three rows to two rows. Similarly, the rows generated by the first set of full-adder strings are thereafter again reduced in number by the same method. This process is repeated until two rows are left. These two rows are then added by a conventional carry-save adder circuit involving substantial carry-ripple or carry-propagation delays.

This technique provides a significant reduction in the time to combine the summands because the delays incurred in the reduction process above prior to the last addition of two rows are substantially less than those incurred by previous methods involving regular row-by-row addition using conventional carry-save adding techniques.

Another technique for reducing the summands to two numbers whose sum equals the multiplier/multiplicand product is described in an article by L. Dadda entitled "Some Schemes for Parallel Multipliers", in volume 34 of IEEE Transactions on Electronic Computers dated 1965 at pages 349-356. This technique utilizes counters to reduce the rows in the matrix by stages until two rows remain which can be added by conventional carry-save adders. Although this technique reduces the matrix in fewer steps than that of Wallace, several steps are still required to yield the final two numbers to be added to form the multiplicand/multiplier product.

These prior art techniques for high-performance data processing systems, however, require the utilization of a substantial number of components and consume a significant amount of space in the processor thereby adding substantially to the cost of the data processing system. In smaller data processing systems, such as minicomputers, this cost has in the past been prohibitive. Therefore, prior art minicomputer systems have for the most part utilized a technique wherein the entire multiplicand is multiplied individually by each bit of the multiplier. Specifically, the multiplicand is first multiplied by the first bit of the multiplier and thereafter is shifted in a shifter and added with the product of the second bit of the multiplier with the entire multiplicand. This result is then shifted and added with the product of the multiplicand and the third bit of the multiplier. Similarly, this process is repeated until each bit of the multiplier has been multiplied with the multiplicand and added to the previous result thereby yielding the final multiplier/multiplicand product.

In one prior art minicomputer system, a technique is used to examine the contents of the multiplier so that, when bits of the multiplier representing binary 0 occur, the shifter circuitry is immediately arranged to shift its contents thereby avoiding a multiplication step.

These prior art minicomputer multiplication techniques are, of course, substantially slower in terms of speed than the techniques used for the prior art high-performance data processing systems. However, these techniques are substantially less expensive to incorporate.

SUMMARY OF THE INVENTION

The present invention, then, comprises high-speed multiplication apparatus which may be incorporated in a smaller, economical system such as a minicomputer system to provide improved performance than the prior art minicomputer multiplication techniques and at substantially less cost than the prior art, high performance multiplication techniques. Specifically, the present invention comprises a multiplication technique wherein a segment of the multiplier is multiplied with the multiplicand and, wherein the resultant summands are reduced in one step to two numbers whose sum equals the product of the multiplicand and the segment of the multiplier.

The present invention makes use of a plurality of counters, preferably read-only memories (ROMs), which are preprogrammed to reduce or count in one step the digits in the summands representing the same power of the number 2 to a sum and carry output which may be coupled along with the outputs from other counters to form the two numbers whose summation equals the product of the numbers being multiplied. This product is then shifted and added to the product of the multiplicand and another segment of multiplier, etc., until the final multiplier/multiplicand product is produced.

The present invention provides an improvement over the prior art minicomputer techniques in performance without increasing the cost in terms of components, circuitry and space consumed in the system. With respect to the prior art, high performance multiplication techniques, the present invention requires approximately one-third of the components utilized in these techniques while yielding a performance which is approximately one-half that of these techniques.

BRIEF DESCRIPTION OF THE DRAWINGS

FIG. 5 is a table illustrating the outputs of a counter circuit of the present invention with respect to the various combinations of inputs thereto.

FIG. 6 is a table depicting the sequence of stages in the multiplication of two double-precision fractions.

DESCRIPTION OF THE PREFERRED EMBODIMENT

Figure 1:
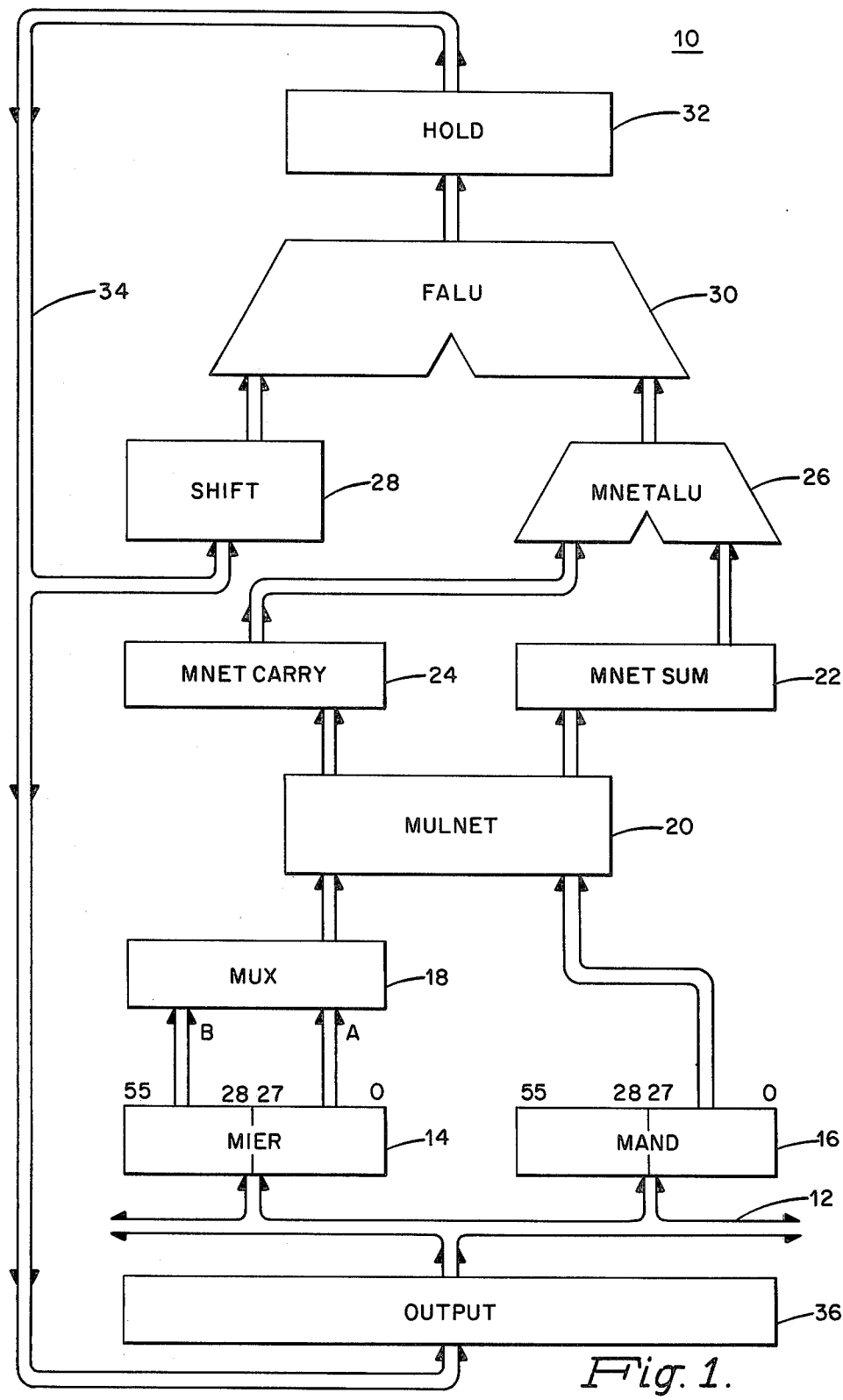
FIG. 1 is a block-schematic diagram illustrating the apparatus used in a data processing system to multiply the fractional components of two floating point numbers.

Referring now to FIG. 1, a partial, block diagram of a floating point processor used in a data processing system which incorporates the present invention is illustrated and, in particular, the apparatus used in the floating point processor to perform high-speed parallel multiplication.

Two floating point numbers which are to be multiplied by the apparatus in FIG. 1 are coupled thereto by a data bus 12. The two floating point numbers are each comprised of an exponent and a fraction. To perform the required multiplication of both floating point numbers, the fractions of each must be multiplied and recombined with the summation of the exponents of both floating point numbers. Accordingly, the exponents of both numbers are coupled to circuitry (not shown) for summation and, upon completion of the multiplication of the fractions, will be concatenated with the fractional product to form the required multiplication product.

The fractions of the two floating point numbers to be multiplied are separately transmitted over the data bus 12 to the multiplier circuitry 10 in FIG. 1. Specifically, the first fraction is loaded into a multiplier register 14 from the data bus 12. The second fraction is then transmitted over the data bus 12 to a multiplicand register 16. Both the multiplier and multiplicand registers are shift registers. Because the multiplier circuitry 10 on FIG. 1 is arranged to perform double-precision multiplication in addition to single-precision multiplication, both the multiplier register 14 and the multiplicand register 16 each have a capacity for storage of 56 bits. For the purpose of the description of the preferred embodiment, however, examples will be described in which single-precision floating point numbers having a fractional component comprised of 24 binary bits will be described. It should be noted, though, that the present invention may be used for multiplication of fractional components of floating point numbers of any size. The multiplier register 14 and the multiplicand register 16 are thus loaded with 24 bit (i.e. single-precision) numbers to be multiplied and recombined with the summation of the exponents to form the required multiplication product.

In order to reduce the cost of the multiplier circuitry, the multiplication of these two fractions is performed in stages. Accordingly, the low-order 8 bits of the multiplier are selected by a multiplexor circuit 18 for coupling to a multiplication circuit (hereafter MULNET) 20. For single-precision multiplication, the multiplexor 18 is arranged to select the contents only at its A input for coupling to the MULNET circuit 20. However, if double-precision multiplication were required, the multiplexor 18 would be arranged to alternately select the contents at its A and B inputs. Additionally, the low order 28 bits of the multiplicand register 16 are also coupled to the MULNET circuit 20 for multiplication with the low order 8 bits of the multiplier. In the case of single-precision multiplication, the 4 higher order bits of the 28 bit number moved from the multiplicand register 16 to the MULNET circuit 20, of course, would be zero.

The MULNET circuit 20 has a first output coupled to a MNETSUM register 22 and a second output coupled to a MNETCARRY register 24. The MULNET circuit 20 will perform a plurality of arithmetic manipulations with the 8-bit multiplier input and the 28-bit multiplicand inputs such that a number is coupled from each output thereof to the MNETSUM register 22 and the MNETCARRY register 24 respectively, whose sum equals the product of the 8-bit multiplier and 28-bit multiplicand coupled to the inputs of the MULNET circuit 20. The numbers stored in the MNETSUM register 22 and the MNETCARRY register 24 are coupled to separate inputs of an arithmetic logic unit, MNETALU circuit 26, wherein these numbers will be added to produce the product of the 8-bit×28-bit multiplication. The output of MNETALU circuit 26 is coupled then to the input on another arithmetic logic unit, FALU circuit 28 for addition with the contents of a shifter 28 coupled to the other input of the FALU circuit 30.

During the first stage of the multiplication of the fractions stored in the multiplier register 14 and the multiplicand register 16, the contents of a holding register (AR) 32 will be zero. The output of the FALU circuit 30 is coupled into the holding register, AR, 32 and thereafter coupled, via bus 34, to the input of a shifter 28.

After the contents of the MNETSUM register 22 and the MNETCARRY register 24 are coupled to the MNETALU 26 in the first stage, the second stage in the multiplication of the fractions in the multiplier and multiplicand registers is commenced. In this second stage, the contents of the multiplier register 14 are shifted to the right by 8 bits such that the second group of 8-bits in the multiplier fraction are selected at the A input of the multiplexor 18 for coupling to the MULNET circuit 20 along with the lower order 28 bits of the multiplicand register 16. Similar to the first stage, the MULNET circuit 20 will generate two numbers couled separately to the MNETSUM register 22 and the MNETCARRY register 24 whose sum equals the product of the 8-bit×28-bit multiplication. The output of the MNETCARRY and the MNETSUM registers 24 and 22 respectively are coupled to the MNETALU 26 for summation. At this point, the output of the MNETALU 26 is coupled to the FALU circuit 30 along with the contents of the AR register 32 through the shifter circuit 28. However, because of the fact that the multiplication of the first 8-bit×28-bit number represent lower order powers of 2, the contents of the AR register 32 are shifted by the shifter circuit 28 so that, when the output from the MNETALU 26 and the AR register 32 are summed, bits representative of the same power of the number 2 are added together. The output of the FALU 30 is again coupled to the holding register 32 for storage therein.

If the fractions coupled to the multiplier register 14 and the multiplicand register 16 are from single-precision floating point numbers (i.e. 24 bits in length) one more stage of multiplication is required. In this stage, the contents of the multiplier register 14 are again shifted to right by 8 bits so that the highest order 8-bits are coupled to the A input of the multiplexor 18 for multiplication with the 28 bit output from the multiplicand register 16 in the MULNET circuit 20. After summation in the FALU circuit 30 with the contents of the AR register 32, appropriately shifted by the shifter circuit 28, the output of the FALU circuit 30 which equals the multiplier/multiplicand product of the two single-precision fractions is transmitted over the data bus 34 to an output register 36. The output of the output register 36 is eventually coupled onto the data bus 12 along with the summation of the exponents of the 2 floating point numbers (not shown) for coupling to another location on the data processing system.

In the event that the fractions being multiplied are double-precision numbers (56 bits in length) the multiplication stage process described above wherein 8-bit×28-bit products are produced in stages would be repeated eleven more times to produce the final product for coupling again to the output register 36. The sequence by which the multiplicand and multiplier are multiplied for double-precision fractions can best be understood by referring to the table in FIG. 6. In FIG. 6, the seven 8-bit fields of the multiplier are represented respectively by Ro through R6 according to ascending powers of the number 2. The multiplicand register 16, the contents of the multiplicand are divided into two groups represented by Do and D28 which represent respectively the low order 28 bits of the multiplicand and the high order 28 bits of the multiplicand. Thus, in the sequence depicted in FIG. 6, the contents of the multiplier register and the multiplicand register 60 are multiplied to produce the double-precision product using appropriate shifting of the contents in the multiplier register 14 and the multiplicand register 16.

Figure 2:
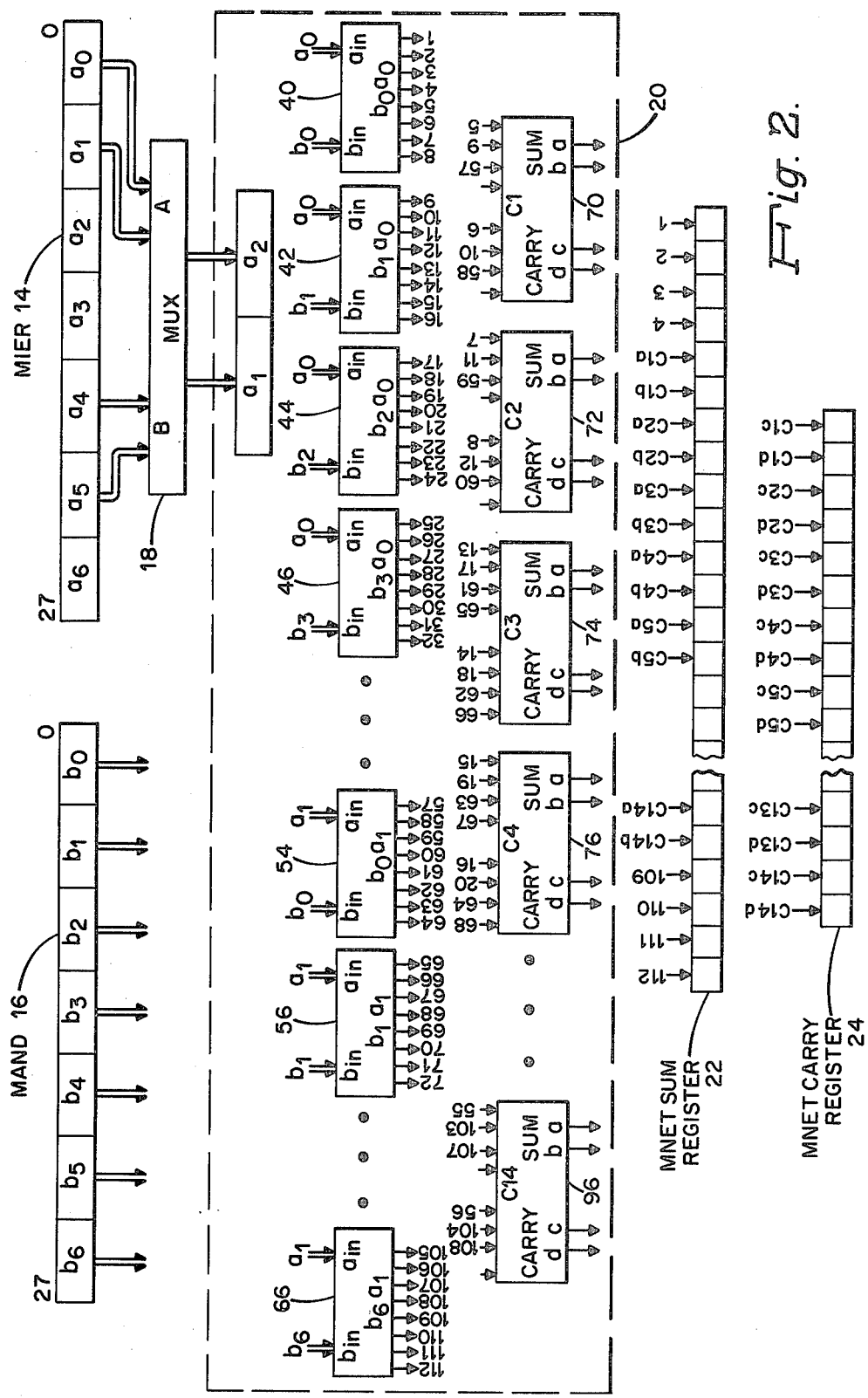
FIG. 2 is a block-schematic diagram of the present invention illustrating, in particular, the components utilized to reduce the summands in one step to two numbers whose sum equals the multiplication product.

Referring now to FIG. 2, the multiplier circuit 10 and, in particular, the MULNET circuit 20, of FIG. 1 is illustrated in greater detail. In order to generate the two outputs from the MULNET circuit 20 for coupling to the MNETSUM register 22 and the MNETCARRY register 24, the inputs to the MULNET circuit 20 are broken up into a plurality of 4-bit hexadecimal digits. Accordingly, seven of these hexadecimal digits, $b_o$ through $b_7$, are coupled from the multiplicand register 16 to the MULNET circuit 20 and two hexidecimal digits, $a_0$ and $a_1$, are selected by the multiplexor circuit 18 from the multiplier register 14 for coupling to the MULNET circuit 20. The MULNET circuit 20 includes 14 multiplier circuits, preferably comprised of read-only memories (ROMs) for multiplying pairs of the 4-bit hexadecimal digits. More particularly, as depicted in FIG. 2, each multiplier hexadecimal digit, $a_o$ and $a_6$, is multiplied with each of the 7 hexadecimal digits from the multiplicand register 16, $b_o$ through $b_6$. Each multiplier circuit, 40 through 66, is pre-programmed to provide an 8-bit summand output equal to the product of the two 4-bit hexadecimal digits coupled to the inputs thereof. The 14 8-bit summands must be reduced then by the MULNET circuit 20 to two numbers which may be coupled to the MNETSUM register 22 and the MNETCARRY register 24 for summation by the MNET ALU 26 to form the product of the 8-bit×28-bit multiplication.

Figure 3:
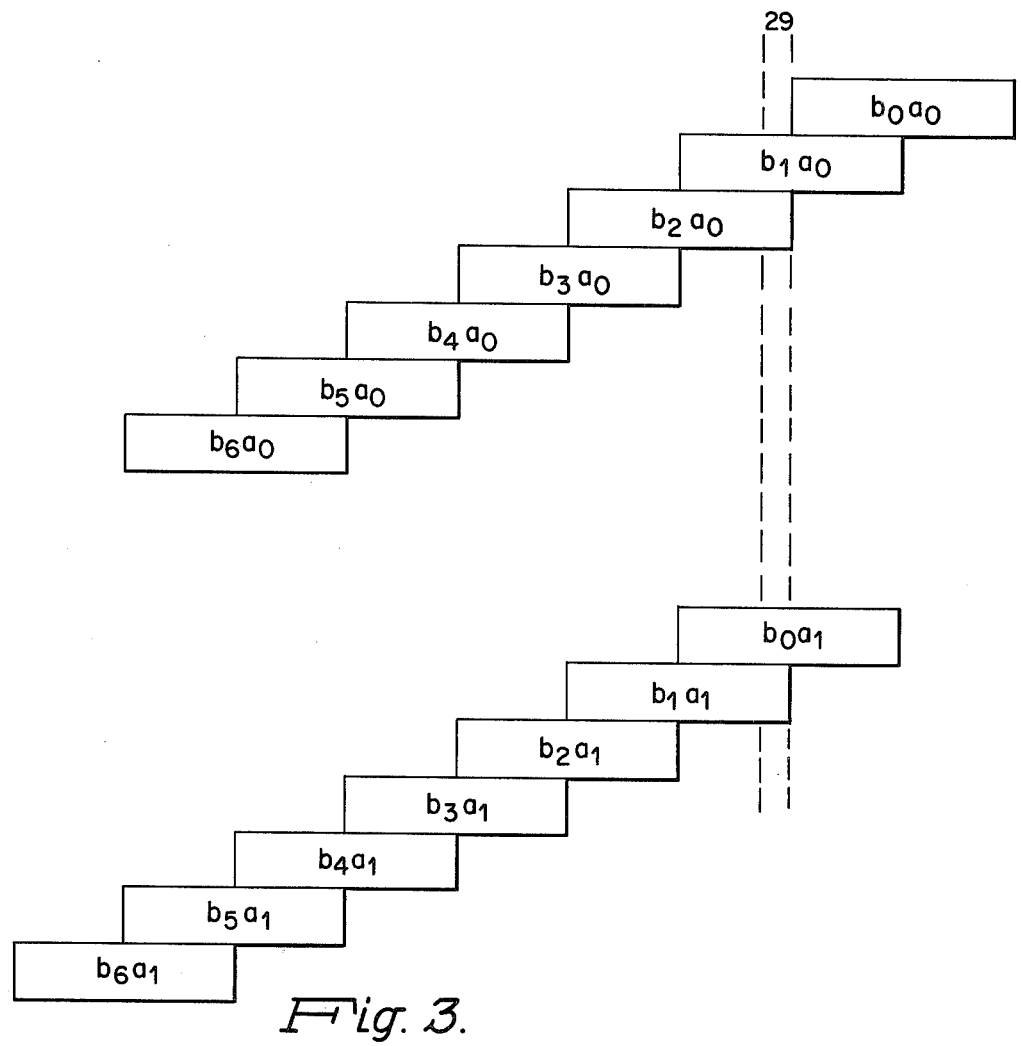
FIG. 3 is a graphical illustration of the summand products of the multiplier circuits in FIG. 2.

Referring now to FIG. 3 a graphic illustration is shown in which the 14, 8-bit summands produced by the multiplier circuits, 40 through 66, are shown in block form. In FIG. 3, all of the 8-bit summands outputs from the multiplier circuits are depicted in columnar form and appropriately shifted from right to left to indicate ascending powers of the number 2. These 8-bit summands must be reduced or counted to form the 2numbers coupled to the MNETSUM register 22 and the MNETCARRY register 24. Still referring to FIG. 3, it can be appreciated that, as many as 4, 8-bit summands may contain a bit position representative of the same power of the number 2. For example, if the lowest order bit in the $b_o a_o$ 8-bit summand is defined as the $2^o$ bit, then, as shown in FIG. 3, the $b_1 a_o$, the $b_2 a_o$, the $b_o a_1$ and $b_1 a_1$ A 8-bit summands all have a bit position therein representing $2^9$ power.

As described above in description of the prior art, the techniques used in the prior art for reducing these 8-bit summands to two numbers whose sum equals the product have typically comprised a multi-step process involving a number of additions involving some carry-ripple delays. The present invention, however, performs this reduction in one step by making use of a table-look-up scheme described in greater detail hereafter.

Figure 4:
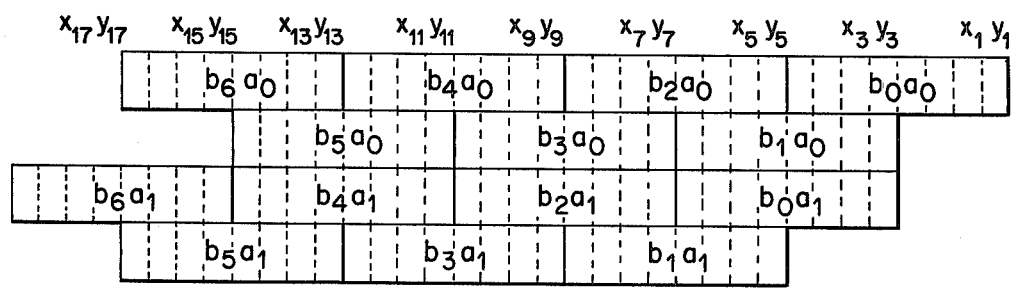
FIG. 4 is a graphical illustration depicting in a different fashion the summand outputs of FIG. 3.

Referring now to FIG. 4, the graphic illustration in FIG. 3 of the 8-bit summands generated at the outputs of the multiplier circuits, 40 through 66, are depicted in a rearranged fashion from that shown in FIG. 3. However, the bit positions of the various 8-bit summands representing the same power of 2 are again disposed in vertical columns. To perform the reduction of the summands to two numbers, the present invention comprises a plurality of counter circuits, preferably read-only-memories (ROMs), in MULNET circuit 20 which utilize a table-look-up scheme to count the number of binary 1s representing the same power of 2 in the 8-bit summands. As earlier noted, there may be as many as four bit positions in the various summands representing the same power of the number 2 and which is clearly depicted by the vertical columns in FIG. 4.

Each counter circuit 70 through 96, in MULNET circuit 20 is arranged to count the binary 1 values in two contiguous columns (i.e. contiguous powers of the number 2) shown in FIG. 4 and to product two outputs, a sum output and a carry output. Both the sum and carry outputs are each comprised of 2 bits. For example, the $C_3$ counter 74 depicted in FIG. 2 is arranged to count the binary 1 values in the two vertical columns labelled $x_5 y_5$ in FIG. 4. Each counter is preprogrammed to provide at the outputs, an output which represents the summation of two groups or columns of binary 1 values.

Specifically, referring now to FIG. 5, wherein the number of binary 1 values contained in y columns of FIG. 4 are designated as the units and wherein the number of binary 1 values contained in x columns of FIG. 4 are designated as the 2's, the carry and sum outputs for all possible combinations of binary 1 values in any pairs of xy columns in FIG. 4 are depicted. In FIG. 5, the entries in the units and 2's columns are provided in decimal notatation and represent the total number of binary 1 values appearing in the x and y columns, respectively, in FIG. 4. On the other hand, the entries in the carry and sum columns are provided in binary notation. Thus, for example, if the 8-bit summands produced in an 8-bit×28-bit multiplication yield a result such that the total number of binary 1 values in the x column equals 2, and in the y column equals 3, the carry and sum outputs from the counter circuit would be 0,1 and 1,1 respectively as indicated by the arrow in FIG. 5.

Referring again to FIG. 2, the specific outputs from the MULNET circuit 20 to the MNETSUM register 22 and the MNETCARRY register 24 are also illustrated. In particular, as shown in FIG. 2, the four low-order bits of the 8-bit summand produced by multiplier 40 are coupled directly to the 4 low-order bit storage locations of the MNETSUM register 22. This is done because of the fact that there will be no other bit positions in any of the remaining 13, 8-bit summands representative of the same powers of the number 2. Similarly, the 4 high-order bits of counter 66 are also directly coupled to the 4 high-order bit storage locations of the MNETSUM register 22 for the same reasons.

The MNETSUM register and the MNETCARRY register 24 are illustrated in FIG. 2 in a manner such that the bit storage locations of each which will be added together by the MULNET ALU circuit 26 are vertically aligned in columns. Thus, for example, the seventh bit position in the MNETSUM register 22 (from the right) which contains the sum a output of the $C_2$ counter 72 will be added by the MNETALU 26 with the contents of the first bit storage location (from the right) in the MNETCARRY register 24 which contains the contents from the carry c output from the $C_1$ counter 70.

The counters, 70 through 96, in FIG. 2 are arranged such that counter 70 counts the binary 1 values in columns $x_3$ and $y_3$ in FIG. 4; counter 72 counts the binary 1 values in columns $x_4$ and $y_4$ in FIG. 4; counter 74 counts the binary 1 values in columns $x_5$ and $y_5$ in FIG. 4; etc. It can be appreciated from FIG. 5 that, with the exception of counter $C_{14}$, 96 the carry c output of each counter will be added by the MNETALU 26 with the sum a output of the next highest counter. Similarly, the carry d output of each counter will be added in the MNETALU circuit 26 with the sum b output of the next highest counter.

The MNETALU circuit 26 is comprised of a plurality of full adder circuits which will generate this final 8 bit×28 bit multiplier/multiplicand product using a carry-save technique. Thus, for example, the contents of the bit storage location of the MNETCARRY register 24 containing the carry c output of the $C_1$ counter 70 will be added with the contents of the bit storage location in the MNETSUM register 22 containing the output from the sum a output of the $C_2$ counter 72. This adder will produce a sum output which is coupled to a register plus a carry output which will be added with the contents of the next, successive bit-storage locations in the MNETCARRY register 24 and the MNETSUM register 22 to produce a sum and a carry output. Similarly, the sum output will be coupled to the register and the carry output to another adder, etc., until the register contains the final summation of the MNETSUM and MNETCARRY register. The output from the MNETALU circuit 26 is thereafter coupled to the FALU circuit 28 for addition with the contents of the AR register 32 shifted by the shifter circuit 28 to form, after the necessary number of iterations or stages, the final multiplication product of the fractions stored in the multiplier register 14 and the multiplicand register 16.

It can be appreciated from the foregoing discussion, then, that the present invention comprises a technique for reducing the summands from the multiplier circuits to two numbers for coupling to the MNETSUM register and the MNETCARRY register in one step. This step involves a table look-up method which generates the outputs to the MNETSUM register and the MNETCARRY register without involving the time delays inherent in the prior art techniques which use multiple stage techniques. Although the description of the present invention has been confined to a configuration in which 8-bit×28-bit multiples are involved, it can be appreciated that other variations are, of course, possible with this technique. It should also be noted that the present invention when compared to the prior art techniques for parallel multiplication is substantially less expensive to incorporate. Specifically, the present invention may be incorporated in a data processing system or, more specifically, a floating point processor, with a package count, with is considerably less than that used to implement the techniques, for example, described above by Dadda and Wallace. The total cost then of the present invention will be considerably less and will consume less power than those described for the aforementioned prior art techniques.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In a data processing system, apparatus for producing the multiplication product of a multiplier and a multiplicand wherein both the multiplier and the multiplicand represent the fractional portion of a floating point number, said apparatus comprising:
   A. first storage means for storing the multiplier;
   B. second storage means for storing the multiplicand;
   C. a plurality of multiplier means each having at least one input coupled to the first storage means and at least one input coupled to the second storage means and each having a plurality of outputs, each multiplier means producing a summand at the outputs thereof comprised of a plurality of binary bits wherein each binary bit represents a power of the number 2 and each is comprised of an electrical signal having a first value representing binary 1 and a second value representing binary $\phi$ and wherein the cumulative total of the summands produced by the plurality of multipler means is equal to the product of the multiplier and the multiplicand;
   D. a plurality of counter means each having a first output and a second output and each having a plurality of inputs individually connected to the outputs of selected multiplier means, and each counter means arranged to count the number of binary bits in each of the summands generated by the multiplier means, representing the same power of the number 2 and having an electrical signal thereon with said first value, for producing at the first output thereof a number which may be combined with the numbers produced at the first outputs of the other counter means to form a sum number and, for producing at the second output thereof a number which may be combined with the numbers produced at the second outputs of the other counter means to form a carry number wherein the summation of the sum number and the carry number equals the multiplication product of the multiplier and the multiplicand; and
   E. summing means having a plurality of inputs coupled to the first outputs of the counter means and a plurality of inputs coupled to the second outputs of the counter means for adding the carry number and the sum number and producing at the output thereof the multiplication product of the multiplier and the multiplicand.

2. The apparatus as described in claim 1 wherein each of the plurality of counter means is comprised of a read-only memory programmed to provide the appropriate output signals at the first and second outputs thereof.

3. The apparatus as described in claim 1 wherein each of the plurality of multiplier means is comprised of a read-only memory programmed to provide the proper summand output in response to the inputs coupled thereto.

4. The apparatus as described in claim 1 further including:
   A. third storage means having a plurality of inputs individually coupled to the first outputs of each counter means and an output coupled to the summing means for storing the sum number; and
   B. fourth storage means having a plurality of inputs individually coupled to the second outputs of each counter means and an output coupled to the summing means for storing the carry number.

5. The apparatus as described in claim 4 further including multiplexor means having at least one input coupled to the first storage means and at least one output coupled to each of the multiplier means for selecting portions of the multiplier for coupling to the multiplier means whereby the output of the summing means represents a partial product of the multiplier and the multiplicand.

6. The apparatus as described in claim 5 further including:
   A. arithmetic logic means having an output, a first input coupled to the output of the summing means, and a second input, each input for receiving electrical signals representative of numbers, said arithmetic logic means for summing the numbers coupled to said first and second inputs and generating at the output thereof a number representative of the summation thereof;
   B. shift storage means having an output coupled to the second input of said arithmetic logic means and an input coupled to the output of the arithmetic logic means for shifting the number at the output of said arithmetic logic means for summation with the output of the summing means;

whereby successive partial products generated at the output of the summing means in response to selected portions of the multiplier coupled to the multiplier means by the multiplexor means are summed together such that the output from the arithmetic logic means is equal to the product of the multiplier and the multiplicand after each portion of the multiplier has been selected by the multiplexor for coupling to the multiplier means.

7. In a data processing system, a method of obtaining the multiplication product of a multiplier and a multiplicand wherein the multiplier represents a part of the fractional portion of a first floating point number and the multiplicand represents the fractional portion of a second floating point number, the method comprising the steps of:
   a. Multiplying portions of the multiplier with portions of the multiplicand to produce a plurality of summands wherein each summand is comprised of a plurality of binary bits each representing a power of the number 2, and wherein each bit is comprised of an electrical signal having a first value representing a binary 1 and a second value representing binary 0, and wherein the cumulative total of all the summands is equal to the multiplication product of the multiplier and the multiplicand;
   b. Counting in one step each bit in the summands representative of the same power of the number 2 and having an electrical signal value representing binary 1 and producing a sum output and a carry output;
   c. Combining each of the sum outputs to form a summation number;
   d. Combining each of the carry outputs to form a carry number; and e. Summing the carry number and the sum number to obtain the multiplication product of the multiplier and the multiplicand.

8. The method of claim 7 further including the steps of:
A. repeating the steps of claim 7 for each multiplier comprising the fractional portion of the first floating point number; and
B. summing the multiplication product of each multiplier and the multiplicand to obtain the multiplication product of the fractional portions of the first and second numbers.

9. The method of claim 8 wherein the step of summing the multiplication products of each multiplier and the multiplicand comprises:
A. summing the multiplication product of each multiplier and the multiplicand with the shifted summation of the previously obtained multiplication products of multipliers and the multiplicand.

* * * * *